United States Patent [19]

Vontobel

[11] 4,090,028
[45] May 16, 1978

[54] METAL ARCING RING FOR HIGH VOLTAGE GAS-INSULATED BUS

[75] Inventor: Jürg Vontobel, Oberentfelden, Switzerland

[73] Assignee: Sprecher & Schuh Ltd. (SSA), Aarau, Switzerland

[21] Appl. No.: 798,344

[22] Filed: May 19, 1977

[30] Foreign Application Priority Data

Sep. 23, 1976 Switzerland .............. 12054/76

[51] Int. Cl.² ............................................. H01B 9/04
[52] U.S. Cl. .................... 174/14 R; 174/16 B; 174/21 C; 174/28
[58] Field of Search ............ 174/14 R, 28, 29, 16 B, 174/111, 99 B, 21 R, 21 C, 22 C

[56] References Cited

U.S. PATENT DOCUMENTS

| 3,324,272 | 6/1967 | Shankle et al. ............ 174/28 X |
| 3,391,243 | 7/1968 | Whitehead ................... 174/28 |
| 3,448,202 | 6/1969 | Whitehead ................... 174/28 |
| 3,813,475 | 5/1974 | Cronin ...................... 174/16 B X |
| 3,814,831 | 6/1974 | Olsen ........................ 174/28 |

FOREIGN PATENT DOCUMENTS 2,360,071  6/1975  Germany ................... 174/28

Primary Examiner—Arthur T. Grimley
Attorney, Agent, or Firm—Ostrolenk, Faber, Gerb & Soffen

[57] ABSTRACT

A metal ring adjacent the support insulator of a gas-insulated bus lines the interior of the outer grounded housing. The ring is formed to define at least a portion of a turn around the central bus so that, in the event of an arc from the central bus to the outer grounded housing, the arc root will fall on the interior of the metal ring and the arc current will create a magnetic field which will cause the arc root to rotate around the interior of the metal ring.

11 Claims, 7 Drawing Figures

INSULATION CEMENT

ELECTRICAL CONNECTION

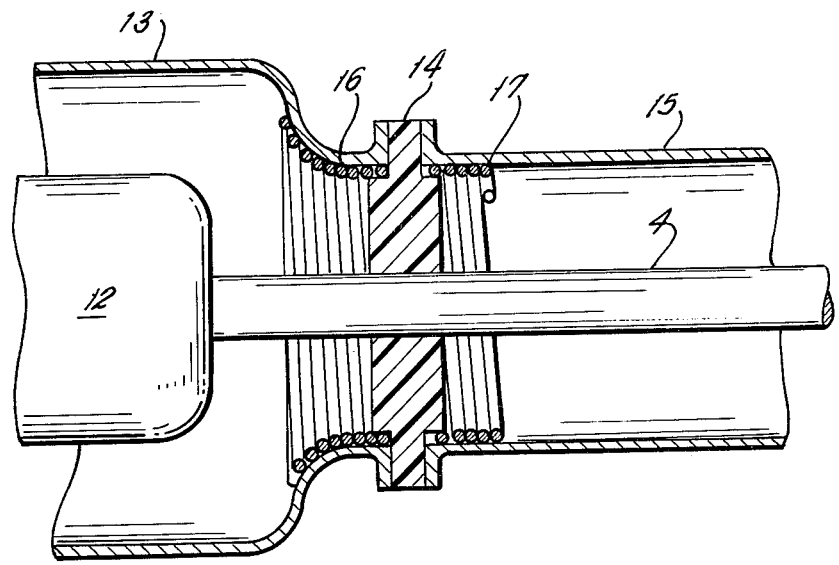
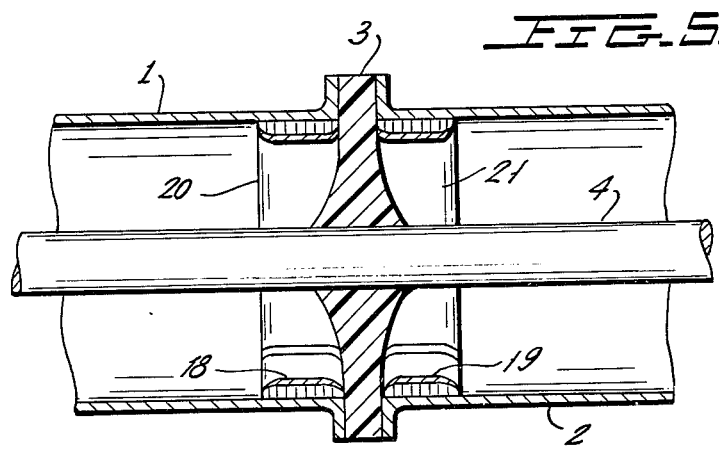
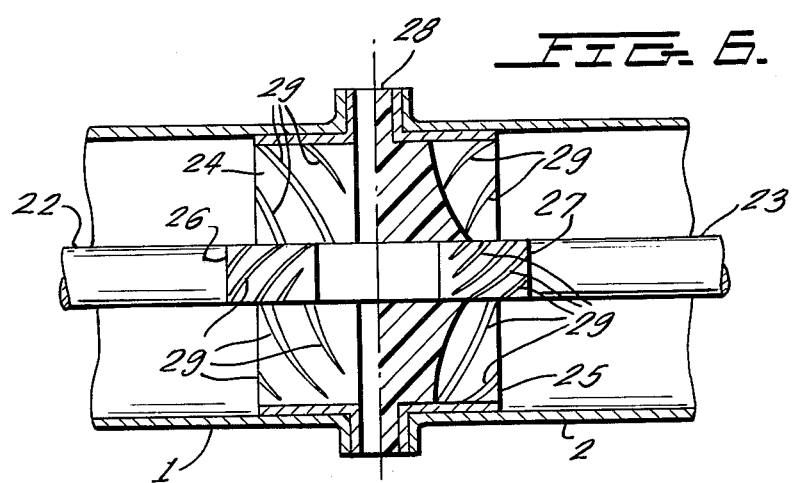

… … …

METAL ARCING RING FOR HIGH VOLTAGE GAS-INSULATED BUS

BACKGROUND OF THE INVENTION

This invention relates to high voltage, gas-insulated bus equipment and more specifically relates to a novel arcing ring for the interior of the bus which is inexpensive and which will decrease the possibility that an interior arc in the bus will burn through the housing by causing the arc root to rapidly spin on the interior periphery of the arching ring.

High voltage gas-insulated bus and transmission lines (herein, the terms bus and transmission lines are used interchangeably) are well known in which a central conductor is centrally supported within the interior of a cylindrical grounded, gas-tight conductive housing or enclosure by spaced insulation supports. The insulation supports may be rods, disks, cones, or any other suitable structure. The interior of the housing is then filled with a suitable insulation gas, typically sulfur hexafluoride, under a given pressure such as three atmospheres. Bus of this type is used for transmission of power at voltages which, typically, may be 345 kV.

If, for some reason, there is a failure within the bus, a power arc may strike from the central conductor to the outer grounded housing. These arcs will move along the length of the housing until they reach a support insulator, and will remain at the insulator until the arc current is interrupted. To prevent the arc from burning through the relatively thin outer housing or enclosure, which conventionally is of aluminum, thick metal rings of arc-resistant material have been placed around the interior of the outer housing and adjacent the support insulator. An arrangement of this type is shown in German Pat. application No. 2,059,330, and DT-OS 2,307,195. These rings can withstand the standing arc root temperature without burn-through if they are sufficiently thick. In addition, the thick rings add resistance in the arc-current circuit. However, these rings are expensive, and require that the grounded housing have an increased diameter where they are located.

Other arrangements are known, for example, as shown in Swiss Pat. No. 541,215 for making the housing sections which might be exposed to arcing, of steel, rather than aluminum. Placing steel sections in an aluminum cylinder is expensive and can lead to corrosion at the joints, leading to the danger of gas leaks in the housing.

A description of the problem solved by the present invention is also given in U.S. Pat. No. 3,931,451 in which arc-resistant material is used for the housing section exposed to arcing.

BRIEF DESCRIPTION OF THE INVENTION

In accordance with the present invention, a novel arcing ring is provided around the interior of the outer housing and adjacent the support insulator, which defines at least a portion of an electrical turn around the central conductor. Consequently, if an arc strikes from the central conductor to the interior surface of the ring, arc current flow must circulate around the ring before current enters the gounded housing. This then establishes a magnetic field having at least one component which is perpendicular to the arc plasma, forcing the arc to spin around the enclosed space in a plane perpendicular to the enclosure axis. Thus, the arc root is not stationary on the ring, and the ring may be thin, and easily fabricated and still resistant to burn-through by the arc root temperature.

BRIEF DESCRIPTION OF THE DRAWINGS

FIG. 4 is a partial cross-sectional view along the axis of a gas-insulated system in which the conductor is connected to a disconnect switch, wherein the invention is shown in a third embodiment, employing a ring having a plurality of helical turns.

FIG. 5 is a view similar to that of FIGS. 1 and 3 of a further embodiment of the invention which incorporates a plurality of turns for the ring.

FIG. 6 is a view similar to that of FIGS. 1, 3 and 5 of a still further embodiment of the invention which incorporates slotted arcing rings for both the grounded housing and central conductor.

DETAILED DESCRIPTION OF THE DRAWINGS

Figure 1:
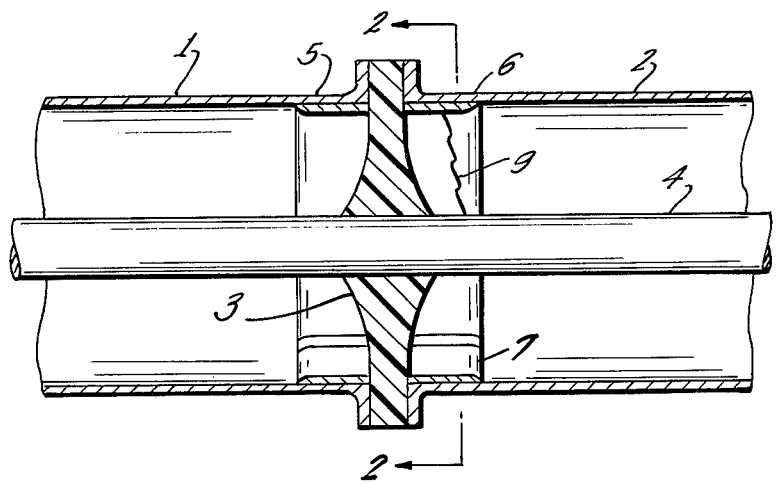
FIG. 1 is a partial cross-sectional view along the axis of a gas-insulated bus which contains the novel arcing ring of the present invention.

FIG. 1 illustrates a portion of a gas-insulated bus and shows two housing sections 1 and 2 which are gas-tight grounded enclosures filled with a suitable insulation gas. An insulation disk 3 is fixed between the ends of housings 1 and 2 and centrally receives a central conductor 4 which is at high voltage relative to grounded housings 1 and 2.

Figure 2:
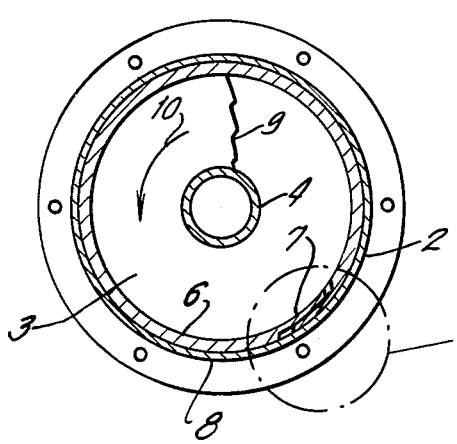
FIG. 2 is a cross-sectional view of FIG. 1 taken across the section line 2—2 in FIG. 1.
Figure 2A:
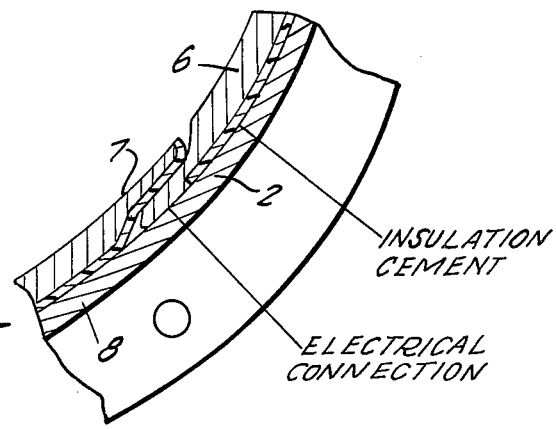
FIG. 2a is an enlarged section of FIG. 2.

In accordance with the invention, ring-shaped inserts 5 and 6 are formed on the interior surfaces of housings 1 and 2, respectively, adjacent the insulator 3. Rings 5 and 6 are relatively thin and may be formed of a metal which has better arc-resistant properties than the aluminum housings 1 and 2. The rings may be cemented to the interior of housings 1 and 2 by a suitable insulating cement which insures that all of the ring surface, except for one end 8 of each of the rings are insulated from the housings 1 and 2. The ends 8, however, are electrically connected to housings 1 and 2 as is best shown in FIGS. 2 and 2a, while the opposite ends 7 are electrically insulated from ends 8 and the housings 1 and 2.

In operation, if there is a failure of the gas insulation, and an arc is created in housing 2, the arc will propagate along the bus until it reaches insulator 3 where it will be stopped. This arc is shown as arc 9 in FIGS. 1 and 2. One end of the arc is rooted on the interior surface of ring 6, and current flows into ring 6, and then peripherally around the ring 6 to the point at which ring 6 is connected to housing 2. This current loop then creates a magnetic field having an axial component which tends to rotate the arc 9 around the axis of bus 4 in the direction of arrow 10 in FIG. 2. Thus, the arc root of arc 9 moves over the surface of ring 6 rather than remaining stationary at one point of the ring adjacent the insulator. Consequently, the ring 6 may now be made of a thin, inexpensive material, and may even be made of aluminum, of the same thickness as that used for the housing 2. Alternatively, ring 6 (and the other identical rings of the system) may be made of a more arc-resistant material.

Figure 3:
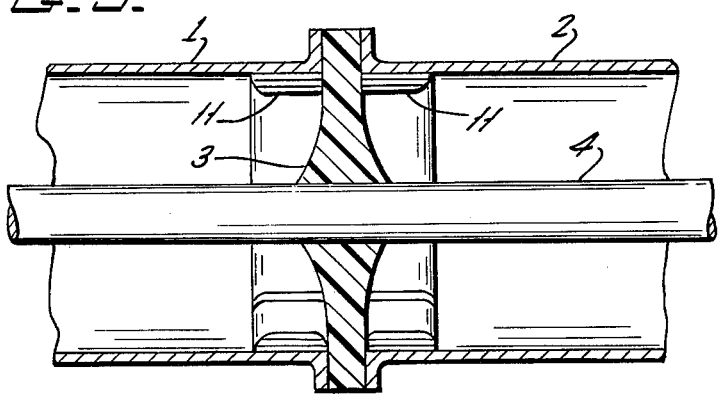
FIG. 3 is a view similar to that of FIG. 1 of a second embodiment of the invention wherein the ring has a plurality of spirally disposed turns.

FIG. 3 shows a second embodiment in which multipleturn spiral coils 11 of a thin, flat conductor have their outer ends connected to housings 1 and 2, respectively. The surfaces of coils 11 are covered with a suitable electrical insulation, except for their interior surfaces which are bare. The coils 11 act in the same manner as that desribed for coils 5 and 6 in FIG. 1.

FIG. 4 shows a further embodiment of the invention wherein conductor 4 is supported within a conductive grounded enclosure 15 by an insulator disk 14. Conductor 4 extends into an enlarged diameter housing 13 which contains a suitable switch 12. In the arrangement of FIG. 4, the novel metal arcing ring of the invention takes the form of helical windings 16 and 17 on opposite sides of insulator 14. The helical windings 16 and 17 each consist of multiple turns which are insulated from one another and from the housings 13 and 15, respectively. However, the ends of the windings 16 and 17 adjacent insulator 14 are electrically connected to housings 13 and 15, respectively, and the inner diameter of windings 16 and 17 have insulation removed therefrom to insure that the arc root of an arc from conductor 4 can land on the inner surface of appropriate winding 16 or 17. Note that the insulator disk 14 partially overlies the adjacent ends of windings 16 and 17 to insure that at least a portion of one of the windings will be series with an arc, even though the arc has reached the insulator. The windings 16 and 17 will now operate in a manner similar to that disclosed for windings 5 and 6 in FIG. 1.

The embodiment of FIG. 5 is similar to that of FIGS. 1 and 3, but shows a still different configuration for the windings 18 and 19 which serve the function of windings 5 and 6, respectively, in FIG. 1. Thus, windings 18 and 19 are each wound as helical windings which are insulated from one another and from their respective housing sections 1 and 2. The end of each of windings 20 and 21 adjacent insulator 3 is then connected to housing sections 1 and 2, respectively. Split continuous conductive cylinders 20 and 21 overlie windings 18 and 19, respectively, but their adjacent surfaces are insulated from one another. The outer end of windings 18 and 19 are electrically connected to cylinders 20 and 21. Thus, an arc from conductor 4 to either cylinder 20 or 21 will be rotated under the influence of the magnetic field created by the arc current flowing in winding 18 or 19, respectively.

FIG. 6 shows a still further embodiment of the invention. In FIG. 6, thin metal sleeves 24 and 25 are formed between the insulator disk 28 and housing sections 1 and 2, respectively. The sleeves 24 and 25 are electrically connected to housings 1 and 2, respectively, only at the sleeve ends adjacent the insulator and the axially removed regions of sleeves 24 and 25 are insulated from housings 1 and 2, respectively. In FIG. 6, only the right-hand portion of insulator 28 is shown, and the left-hand portion is removed to illustrate the full sleeve 24. The interior surfaces of sleeves 24 and 25 are bare, and they each contain a plurality of helical notches 29, extending outwardly from their adjacent ends.

Similar conductive sleeves 26 and 27 are secured to conductor 4 on opposite sides of insulator 28. The adjacent ends of sleeves 26 and 27 are electrically connected to conductor 4 and their outer ends are insulated therefrom. Each of sleeves 26 and 27 also have helical notches 29, and their outer surfaces are bare.

In operation in FIG. 6, an arc from conductor 4 to housing 1 or housing 2 will ultimately root between sleeves 24 and 26 or between sleeves 25 and 27, respectively. The helical notches 29 will cause the arc current to produce an axial magnetic field component which, in turn, will cause the arc to rotate, as in the preceding embodiments. Note that the notches 29 extend beneath insulator 28 so that an axial field is produced, even though the arc is at the surface of insulator 28.

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined are follows:

1. A metal arcing ring for a high voltage gas-insulated bus; said bus comprising an elongated central conductor, an outer conductive gas-filled housing surrounding said central conductor and extending coextensively therewith, a support insulator secured to said central conductor and supporting said central conductor within said housing; said metal arcing ring comprising an electrically conductive member fixed to the interior of said housing and adjacent said support insulator and having an arc receptive surface facing said central conductor; said electrically conductive member defining at least a portion of a current carrying turn around said central conductor for producing a magnetic field which has at least a component thereof in an axial direction to the axis of said housing; one end of said conductive member being electrically connected to said housing; the remainder of said member being electrically insulated from said housing.

2. The device of claim 1 wherein said metal arcing ring is of the same material as said housing.

3. The device of claim 1 wherein said metal arcing ring has substantially the same thickness as said housing.

4. The device of claim 1 wherein said metal arcing ring defines a single turn.

5. The device of claim 1 wherein said metal arcing ring defines a plurality of turns.

6. The device of claim 1 wherein said metal arcing ring consists of a plurality of helically wound turns.

7. The device of claim 1 wherein said metal arcing ring consists of a plurality of spirally wound turns.

8. The device of claim 6 which further includes a split metal cover ring covering the interior of said helically wound turns and electrically connected to the end of said helically wound turns which is farthest from said support insulator.

9. The device of claim 1 in which said metal arcing ring consists of a metallic sleeve having a plurality of helical notches therein extending from one outer end thereof to a solid rim portion which is disposed adjacent said support insulator.

10. The device of claim 9 which further includes a second metallic sleeve fixed to said central conductor and connected to said central conductor at an end adjacent said support insulator and having helical notches extending from the opposite end and toward said one end thereof.

11. The device of claim 1 wherein said support insulator extends over an axial portion of said metal arcing ring.

* * * * *